United States Patent [19]

Kuma

[11] Patent Number: 5,501,007
[45] Date of Patent: Mar. 26, 1996

[54] METHOD OF PRODUCING SORBING SHEETS AND LAMINATES HAVING REACTIVATING AND INVIGORATING FUNCTIONS

[75] Inventor: Toshimi Kuma, Fukuoka, Japan

[73] Assignee: Kabushiki Kaisha Seibu Giken, Fukuoka, Japan

[21] Appl. No.: 67,622

[22] Filed: May 28, 1993

[30] Foreign Application Priority Data

Jun. 7, 1992 [JP] Japan ................... 4-189813

[51] Int. Cl.⁶ ................................. H05K 3/02
[52] U.S. Cl. ..................... 29/846; 55/269; 156/265; 219/544; 338/254; 96/153
[58] Field of Search ............... 29/846; 55/208, 55/269; 156/205; 338/254, 212; 219/544

[56] References Cited

U.S. PATENT DOCUMENTS

| | | | |
|---|---|---|---|
| 3,594,990 | 7/1971 | Hawley | 55/208 X |
| 4,269,611 | 5/1981 | Anderberg | 55/208 X |
| 4,599,095 | 7/1986 | Barnes et al. | 338/712 X |
| 4,911,775 | 3/1990 | Kuma et al. | 156/205 X |

FOREIGN PATENT DOCUMENTS

| | | |
|---|---|---|
| 578371 | 1/1994 | European Pat. Off. . |
| 2659869 | 9/1991 | France . |
| 3045617 | 8/1981 | Germany . |
| 1473947 | 5/1977 | United Kingdom . |

*Primary Examiner*—Carl J. Arbes
*Attorney, Agent, or Firm*—Staas & Halsey

[57] ABSTRACT

A resistor, such as a resistor wire, is contained in a sheet, preferably a low density sheet consisting mainly of inorganic fiber. Adsorbent or absorbent (hereinafter "sorbent" collectively) is fixed to the sheet to obtain sorbing characteristics, such that desorption and reactivation can be accomplished by applying an electric current to the resistor to heat the sheet. A sorbing laminate with many channels may be used by laminating the sorbing sheets. The sorbing sheet can therefore be heated directly from the inner side by the resistor contained in the sheet desorbing the sheets rapidly while the time for reactivating the sorbing sheet is reduced and the reactivation efficiency increased.

16 Claims, 11 Drawing Sheets

METHOD OF PRODUCING SORBING SHEETS AND LAMINATES HAVING REACTIVATING AND INVIGORATING FUNCTIONS

BACKGROUND OF THE INVENTION

1. Field of the Invention

The present invention relates to a sorbing sheet which has reactivating and invigorating functions of sorbing and removing gaseous bodies such as water vapor, organic solvent vapor and offensive odor constituents contained, for example, in the air, and as well relates to a sorbing laminate having a reactivating function and an invigorating function, which is produced by alternately laminating the above-mentioned sorbing sheet and a corrugated sorbing sheet in honeycomb arrangement, or which is made by laminating the sorbing sheets with spacers placed therebetween.

2. Description of the Prior Art

An inorganic fiber sheet laminated and formed in honeycomb structure has been used as a desiccative body, appropriately impregnated with humidity absorbent such as lithium chloride and calcium chloride or with humidity adsorbent such as silica gel, alumina gel and hydrophilic zeolite rigidly fixed. In Japanese Patent Application No. 86969/1985 (U.S. Pat. No. 4,911,775), the applicant of the present invention set forth a method for obtaining an extremely desiccative honeycomb adsorbing body, consisting mainly of metal silicate aerogel with a matrix of inorganic fiber, by forming a low-density sheet using inorganic fiber such as ceramic fiber into a honeycomb structure impregnated with water glass, then soaked in aqueous solution of metallic salt to produce metal silicate hydrogel, and then washed and dried. The applicant of the present application also proposed in PCT/JP91/00592 (U.S. application Ser. No. 07/793,372) a gas adsorbing element having a high efficiency of adsorbing and removing organic solvent vapor and odorous constituents, which is obtained by fixing, by inorganic binder, highly hydrophobic high-silica zeolite to a honeycomb body made of a sheet consisting mainly of ceramic fiber. Reactivation of the honeycomb adsorbing body has been accomplished by passing hot air of 100°–150° C. temperature through small channels of a honeycomb structure.

SUMMARY OF THE INVENTION

When the above-mentioned desiccative body absorbs or adsorbs (hereinafter generically referred to as "sorb") humidity, its sorbing capacity gradually decreases. Moreover, when absorbent is used, dew condensation and other troubles arise. Therefore, its sorbing capacity must be recovered by purging sorbed humidity, i.e., by desorption. For this desorption, i.e., reactivation, heating is used in the thermal swing method and the pressure decrease in the pressure swing method. However, in the pressure swing method, the equipment and the process become large. Therefore, simple heating, for example, heating by hot air, is adopted. Heating by heat conduction between the hot air and the wall of the sorbing body is used to desorb the sorbed humidity, i.e., by passing hot air through small channels of a honeycomb desiccative body. However, when hot air is passed through the small channels to desorb the adsorbed humidity, the temperature of the air is high at the inlet of the small channels, but the temperature is lowered gradually with the disadvantage that the reactivating ability decreases sharply near the outlet. The same is true in the case of desorbing various active materials other than water vapor such as organic solvent vapor and offensive odor materials.

The object of the present invention is to overcome the above-mentioned disadvantages and to provide a sorbing sheet such as a desiccative sheet, which is able to perform desorption and reactivation with little heat energy, and a honeycomb-shaped sorbing laminate which is made by laminating and forming the above-mentioned sorbing sheet and a corrugated sorbing sheet, and also other sorbing laminates. These and other objects are accomplished with a sorbing sheet which is made by synthesizing and fixing adsorbent by chemical reaction in the inside of and on the surface of a sheet containing a resistor, or by impregnating with a rigidly adhering sorbent, and also with a sorbing laminate made by laminating the above-mentioned sorbing sheet and a corrugated sorbing sheet. In other words, when the sorbing sheet and the sorbing laminate of the present invention sorb active gases such as water vapor, organic solvent vapor, nitrogen dioxide and other offensive odorous materials in the air, and when their sorbing capacity decreases, the sorbate can be desorbed and the sorbing sheet or laminate can be reactivated easily and surely in a short time and, in addition, with very little heat energy by applying an electric current to a resistor contained in the sheet and making it generate heat over all of the sheet simultaneously and uniformly. On the other hand, the sorbing capacity of the sorbing sheet and the sorbing laminate gradually decreases by repeating sorption and desorption for a long time. In this case, the sorbate cannot be desorbed at the temperature of 150° C. Therefore, the sorbing sheet and the sorbing laminate can be invigorated by applying an electric current to heat within the range 300°–450° C.

DESCRIPTION OF THE PREFERRED EMBODIMENTS

EXAMPLE NO. 1

Figure 1:
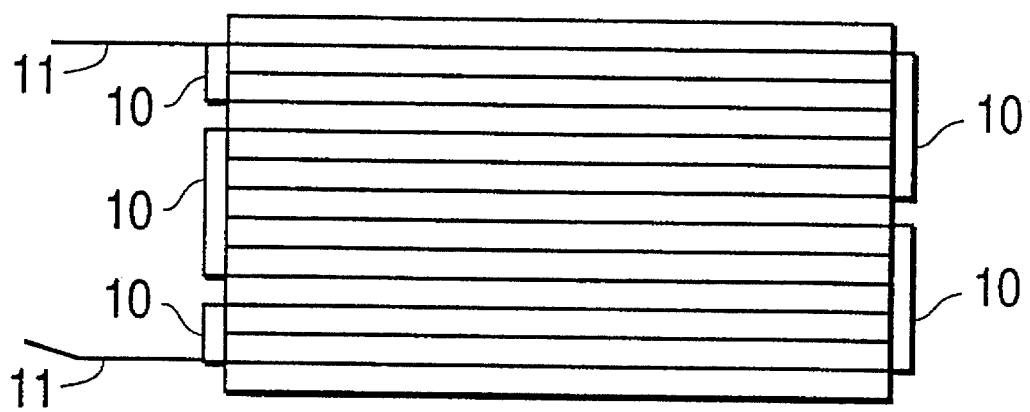
FIG. 1 is a plan view showing an example of a sorbing sheet.
Figure 2:
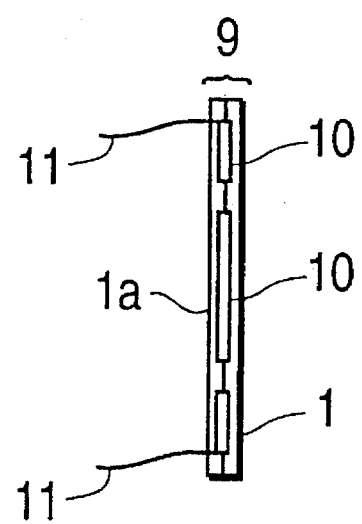
FIG. 2 is a left side elevational view of the sorbing sheet of FIG. 1.
Figure 3:
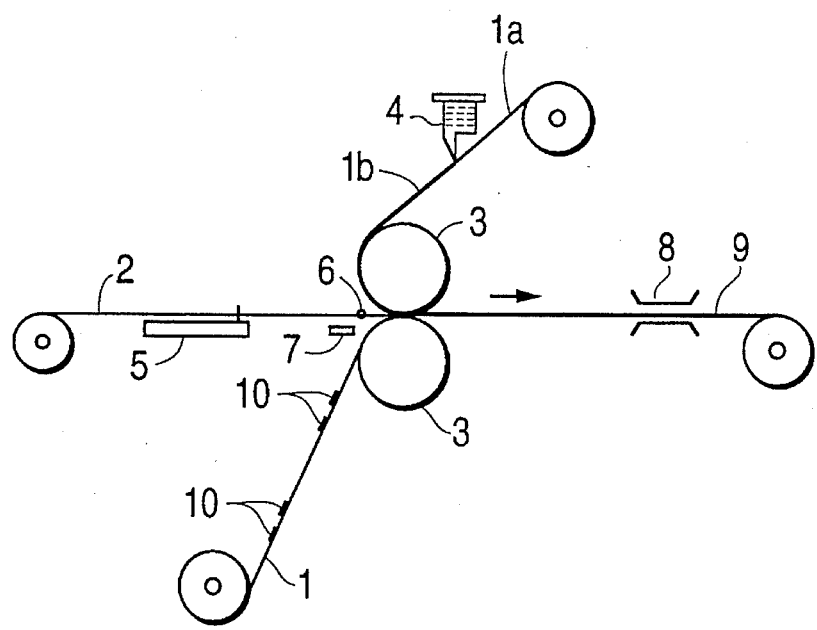
FIG. 3 is a schematic drawing showing an example of the equipment used to manufacture the sorbing sheet of FIG. 1.
Figure 4:
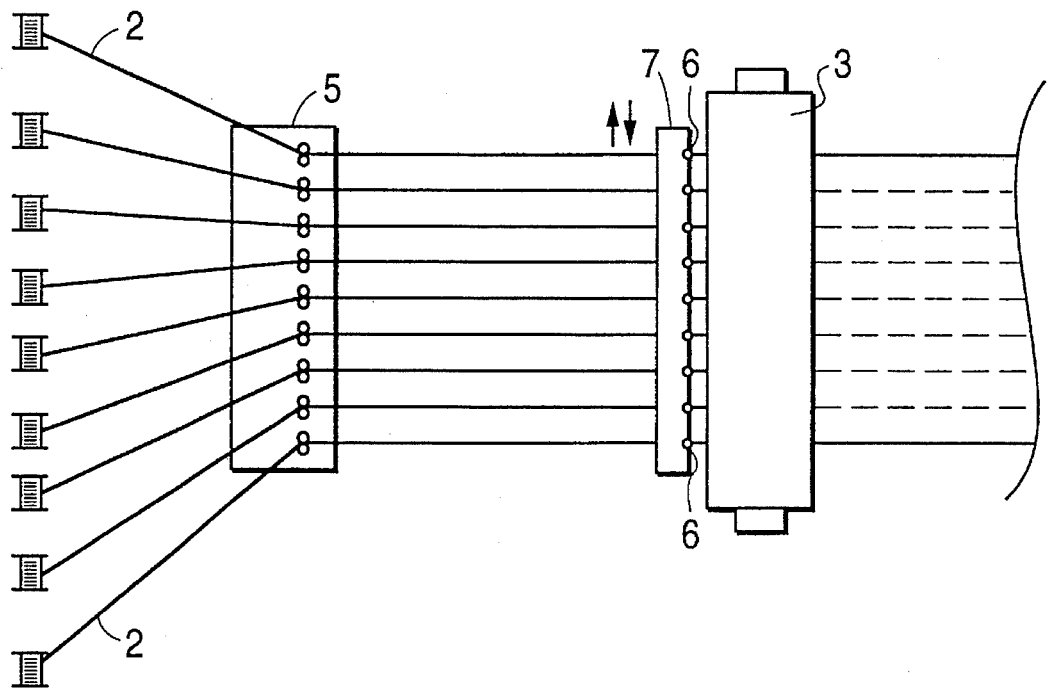
FIG. 4 is an enlarged schematic plan view of the equipment of FIG. 3.

As shown in FIGS. 1 and 2, adhesive, preferably inorganic adhesive, is applied to one of two 0.1–0.2 mm thick low density sheets 1,1a mainly consisting of ceramic fiber. Sheets 1,1a are adhered together with resistor wires 2 between them. The placing and adhering of the resistor wires 2 between the sheets 1,1a is shown in FIGS. 3 and 4. The equipment shown in FIGS. 3 and 4 includes resistor wires 2,2 rolled around bobbins, pressing rollers 3,3, an adhesive applying device 4, a guide 5 and a frame 7 with resistor wire inserting rings 6,6. The sheet 1b is formed by applying adhesive to the sheet 1a by the adhesive applying device 4, and thereafter the sheets 1 and 1b are passed between pressing rollers 3,3. Resistor wires 2,2 are guided by the guide 5 and passed through resistor wire inserting rings 6,6. Resistor wires 2,2 are placed between sheets 1 and 1b immediately before the pressing rollers 3,3. The adhesive is heated and hardened by the heater 8, and the sheet 9 with resistor wires is rolled up. The resistor wires 2,2 are placed at intervals of about 2–4 mm. Soldered electrodes 10,10 are fixed on the sheet 1 at desired intervals, as shown in FIG. 3. Resistor wires 2 and electrodes 10,10 buried in the sheet 9 are bonded by heat melting.

The sheet 9 thus obtained is cut as shown in FIG. 1. Lead wires 11,11 are connected to the electrodes 10,10. The electrical power is determined by suitably dividing the electrodes, as shown in FIG. 1, and controlling the electric resistance of sheet 9. The sheet is soaked in 25–30% aqueous solution of water glass. After it is dried, it is soaked in 21% aqueous solution of aluminum sulfate to produce hydrogel of aluminum silicate by the reaction of water glass and aluminum sulfate. It is washed and dried to obtain an adsorbing sheet with which aerogel of aluminum silicate is combined.

Figure 5:
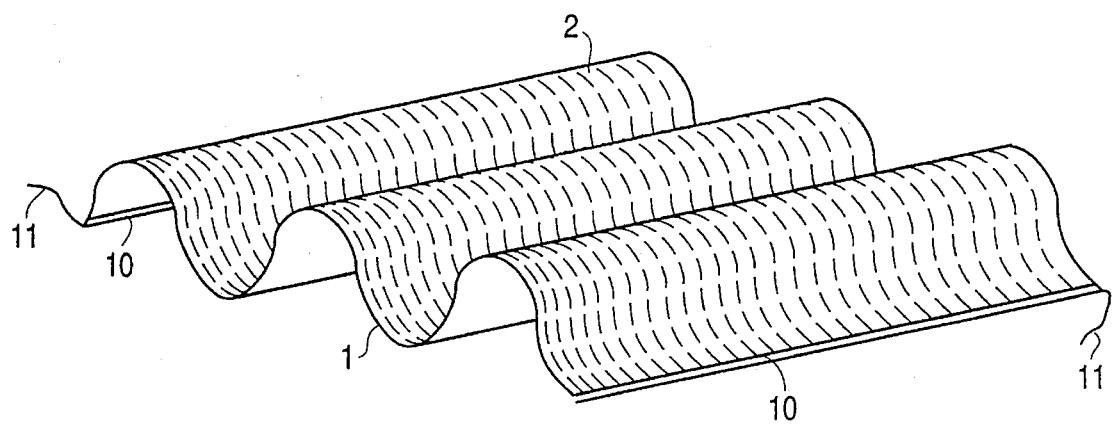
FIG. 5 is a perspective view of a corrugated sorbing sheet.

As shown in FIG. 5, after lead wires 11,11 are combined, the sheet may be corrugated. Metal silicate gel is synthesized and fixed inside the corrugated sheet by the above-mentioned chemical reaction to obtain a corrugated adsorbing sheet. The electricity consumption of resistor wires 2 is set so that the surface temperature of the adsorbing sheet is about 70°–180° C. when current is applied for reactivation.

EXAMPLE NO. 2

Figure 6:
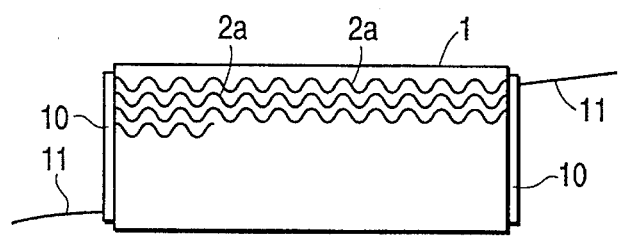
FIG. 6 is a plan view showing another example of a sorbing sheet.
Figure 7:
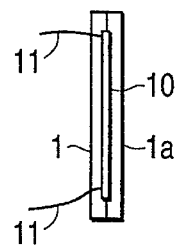
FIG. 7 is a right side elevational view of the sorbing sheet of FIG. 6.

As shown in FIGS. 6 and 7, to one or both of two 0.1–0.2 mm thick low density sheets 1,1a consisting mainly of ceramic fiber, adhesive is applied, preferably an inorganic adhesive. Sheets 1,1a are adhered together placing many resistor wires 2a in parallel and in zigzag lines. The placing and adhering of the resistor wires 2a between the sheets 1,1a in zigzag lines is accomplished by the equipment and method of using same shown in FIGS. 3 and 4. With reference to FIGS. 3 and 4, resistor wires 2a,2a are adhered between sheets 1,1a continuously in parallel and in zigzag-lines by mounting the frame 7 to swing sideways, by passing resistor wires 2a,2a through the resistor wire inserting rings 6,6, and by swinging the sideway swinging frame 7 immediately before pressing rollers 3,3 in the direction of the width of sheets 1,1a, as shown by the arrows in FIG. 4, to obtain the sheet 9.

Resistor wires 2a are connected to electrodes 10,10 in parallel and to lead wires 11,11, as shown in FIG. 6. Then the laminated sheet 9 is soaked in 25–30% aqueous solution of water glass. After the water glass is dried, the sheet is soaked in dilute sulfuric acid to produce silica hydrogel which is combined to the sheet by reaction of water glass and sulfuric acid. The sheet is washed and dried to obtain an adsorbing sheet to which the silica aerogel is combined. The electricity consumption of resistor wires 2a is selected so that the surface of the adsorbing sheet becomes about 80°–180° C. when current is applied for reactivation. The wave length of resistor wires 2a is set at 2–5 mm and the interval of adjacent resistor wires 2a,2a at about 1–5 mm.

EXAMPLE NO. 3

Figure 8:
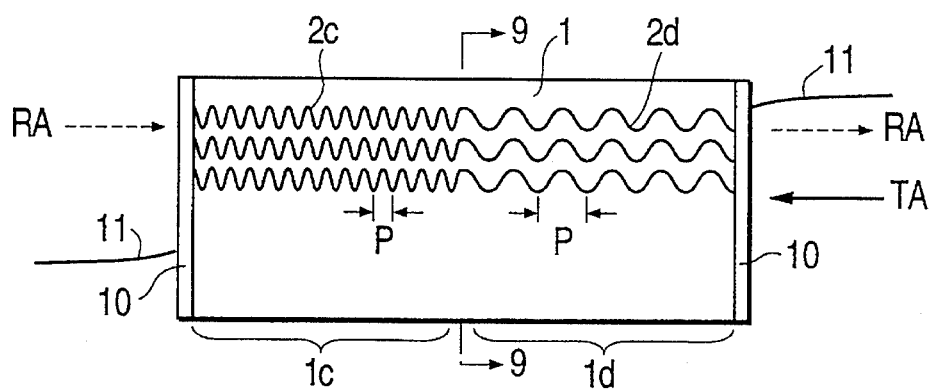
FIG. 8 is a plan view showing another example of a sorbing sheet.
Figure 9:
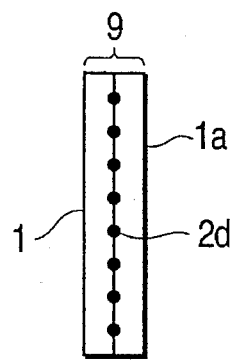
FIG. 9 is a cross-sectional view taken along line A—A of FIG. 8.

As shown in FIGS. 8 and 9, to one of two 0.15–0.25 mm thick low density sheets 1,1a consisting mainly of glass fiber, are placed resistor wires arranged over the surface in parallel and in zigzag lines. The resistor wires are formed with a small wave pitch at 1c and a large wave pitch at 1d. The equipment and method of using same of FIGS. 3 and 4 are used in placing and adhering the resistor wires between sheets 1 and 1a. The resistor wires 2 are passed through the inserting rings 6,6 and the swinging frame 7 is moved in the direction of the arrows in FIG. 4, i.e., in the direction of the width of the sheet 1. The part 2c with small wave pitch and the part 2d with large wave pitch are alternately formed as shown in FIG. 8 by changing the rotation speed of the pressing roller 3, i.e., by changing the moving speed of the sheets and resistor wires or by changing the swinging period of the sideway swinging frame 7. At the same time, resistor wires 2c,2d are positioned and adhered between the sheet 1 and the sheet 1a. The laminated sheet is moved forward to heat and harden the adhesive by the heater 8. The sheet 9 is then rolled up.

The sheet 9 with resistor wires 2c,2d of different pitch P is cut as shown in FIG. 8. The part 1c of the sheet is impregnated with inorganic binder sol with zeolite powder dispersed therein to promote adherence. The part 1d of the sheet is fixed and combined with hydrogel of aluminum silicate as in the case of Example 1. The sheet is washed and dried to obtain an adsorbing sheet to whose 1c part zeolite is combined and to whose 1d part aerogel of aluminum silicate is combined. Resistor wires 2c,2d are connected with electrodes 10,10, as shown in FIG. 8, and lead wires 11,11 are connected with the electrodes to obtain an adsorbing sheet. The electricity consumption of resistor wires 2c,2d is set so that the surface of the adsorbing sheet becomes about 150°–200° C. in the part 1c and about 80°–130° C. in the part 1d when they are applied with a current for reactivation. To the parts 1c and 1d, adsorbents having different reactivating temperatures such as minute particles of alumina gel and active carbon in combination can be combined and rigidly fixed, respectively. When one adsorbing sheet is thus divided into a high-temperature reactivating part and a low-temperature reactivating part, and the outer air TA is moved in the direction shown by the arrow TA, for example, a large amount of water vapor is adsorbed in the part 1d to which the metal silicate gel is fixed because the diameters of the micropores of the metal silicate gel are as large as 20–30 Å, and in the part 1c, because highly desiccative zeolite with small diameters (4 Å) of micropores is fixed, the remaining very small amount of water vapor can be adsorbed by said zeolite. Thus, dry air with low dewpoint can be obtained. Reactivation temperature as high as 150°–200° C. is necessary in the part 1c and reactivation temperature of 80°–130° C. in the part 1d.

As another case, an adsorbing sheet is formed in which the part 1c has no adsorbability and is used as a preheating part for outer air. That is, when the temperature of the outer air is low, the outer air as reactivation air RA is preheated at this 1c part and thereafter the outer air is passed in the 1d part, that is, adsorption part, and the air is discharged so that the water vapor desorbed at 1d part forms no dew condensation.

EXAMPLE NO. 4

Figure 10:
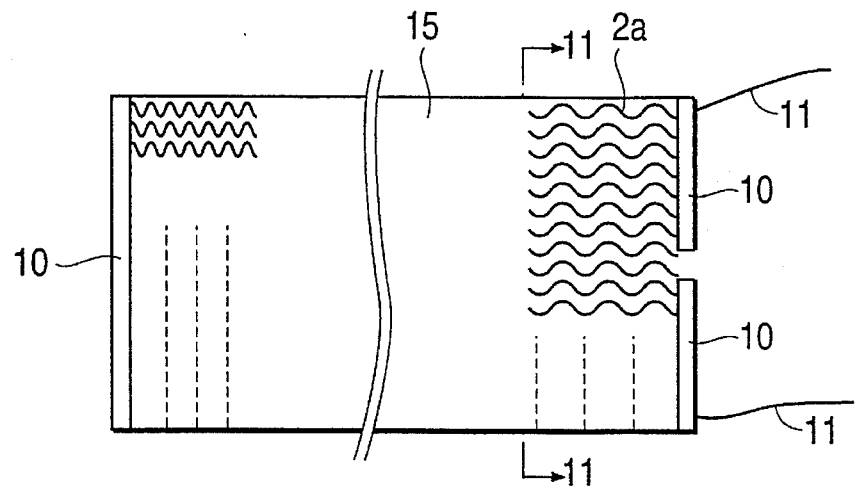
FIG. 10 is a plan view showing another example of a sorbing sheet.
Figure 12:
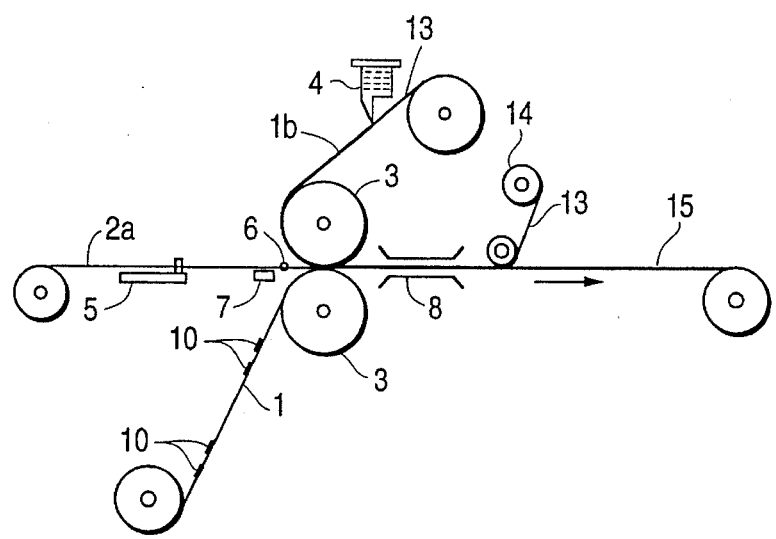
FIG. 12 is a schematic drawing of another example of equipment used to manufacture the sorbing sheet of FIGS. 10 and 11.
Figure 11:
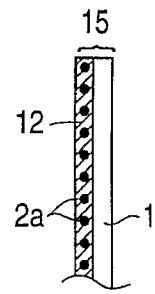
FIG. 11 is a cross-sectional view taken along line B—B of FIG. 10.

As shown in FIGS. 10 and 11, to one side of a 0.1–0.2 mm thick sheet 1 consisting mainly of ceramic fiber, resistor wires 2a are placed in parallel and in zigzag lines and buried in electrically insulating coating agent 12. The equipment shown in FIGS. 4 and 12 is used for this process. This equipment is similar to that disclosed in FIGS. 3 and 4. There is shown in FIG. 12 a sheet 1, a rolled separator film such as a polyester film 13, many resistor wires 2a,2a rolled around bobbins, and coating agent applying equipment 4. To one side of the separator film 13 a coating agent is applied by the coating agent applying equipment 4. Resistor wires 2a are placed in parallel and in zigzag lines and adhered between the sheet 1 and the separator film 13. The sheet is moved forward, the coating agent is dried, and the separator film 13 is rolled up around a roll 14 to obtain a sheet 15 on which resistor wires 2a are buried in the layer of coating agent 12. Electrodes 10,10, preferably plated with solder, are fixed at a desired interval on the surface of the sheet 1. As a coating agent, it is desirable to use one that contains a chemical blowing agent which decomposes and generates foams, when it is heated by the heater 8, and hardens to form communicating pores in the layer of coating agent so that adsorbent is able to contact the outer air. Resistor wires 2a and electrodes 10 buried in the sheet 15 are heated from outside the sheet 15 and combined by melting.

The sheet 15 thus obtained is impregnated with an inorganic reinforcing agent which is rigidly fixed. Then it is soaked in 30% aqueous solution of lithium chloride and dried. The sheet 15 is rigidly fixed with about 5–8 weight percent lithium chloride. The sheet 15 is cut off with electrodes 10,10 left on both ends and lead wires 11,11 are connected to electrodes 10,10, as shown in FIG. 10, to obtain an adsorbing sheet having desiccative capacity. The electrical consumption is selected so that the surface of the sheet becomes about 60°–180° C. when applying a current for reactivation.

EXAMPLE NO. 5

Figure 13:
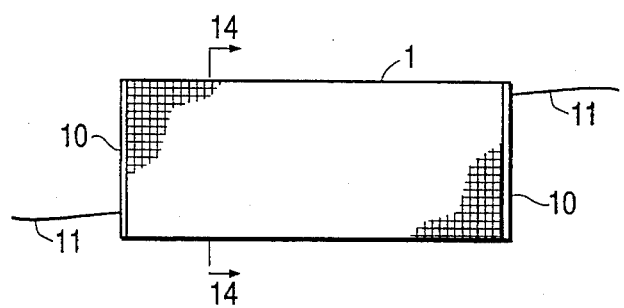
FIG. 13 is a plan view showing another example of a sorbing sheet.
Figure 14:
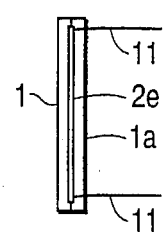
FIG. 14 is a cross-sectional view taken along line C—C of FIG. 13.

As shown in FIGS. 13 and 14, 0.1–0.2 mm thick low density sheets 1,1a consisting mainly of ceramic fiber are prepared. To one side of sheet 1, electrically conductive paint, such as a paste, which is made by mixing minute particles of carbon, silver or other electrically conducting materials into synthetic resin and by dispersing them in organic solvent, is applied. The other sheet 1a is adhered to the paint-applied surface and the laminated sheet is dried and given sorbing capacity by a method similar to Examples 1–4. Electrodes 10,10 are connected to the electrically conductive coating 2e on the sheet and lead wires 11,11 are connected to electrodes 10,10 to obtain a sorbing sheet. The composition and thickness of the electrically conductive coating 2e on the sheet are adjusted so that the surface of the sorbing sheet becomes about 80°–150° C. when a current is applied for reactivation.

EXAMPLE NO. 6

Figure 15:
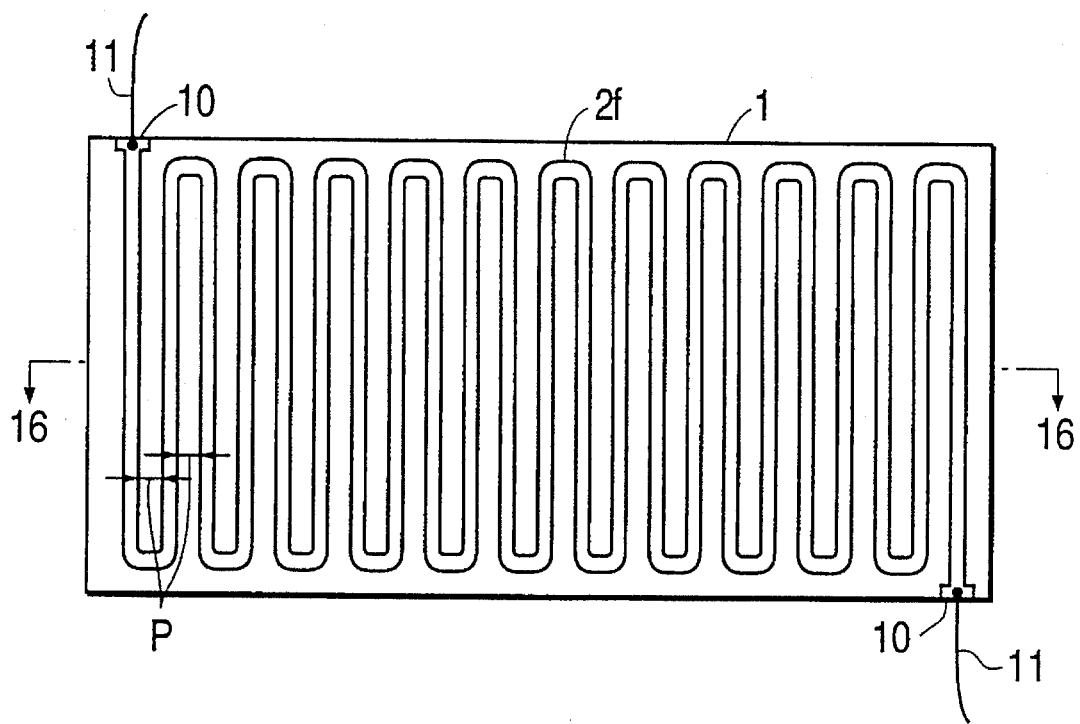
FIG. 15 is a plan view showing another example of a sorbing sheet.
Figure 16:
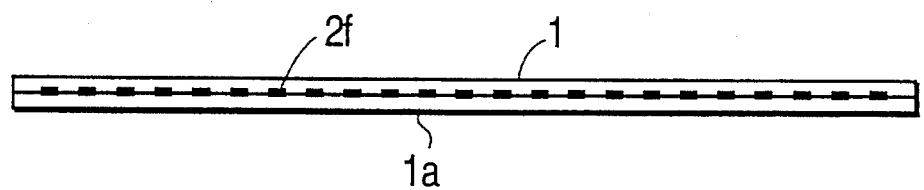
FIG. 16 is a cross-sectional view taken along line D—D of FIG. 15.

As shown in FIGS. 15 and 16, two 0.1–0.2 mm thick low-density sheets 1,1a consisting mainly of ceramic fiber, are prepared. A plane-type resistor 2f, which is made by forming an electrical heat circuit by etching metal foil, several tens of µ thick, for example, copper foil or aluminum foil, is positioned and adhered between sheets 1 and 1a. Terminals 10,10 and lead wires 11,11 are connected to both ends of this resistor. Then adsorbent is combined and rigidly fixed on and in sheets 1,1a to obtain an adsorbing sheet. The pitch P of the electrical heat circuit of metal film may be small on one side and large on the other side so that the temperature of the adsorbing sheet when a current is applied can be changed locally.

In Examples 1–4 above, resistor wires of 0.1–0.2 mm diameter of nickel chrome alloy, nickel copper alloy or others are used naked or with appropriate insulating coating of polytetrafluoroethylene, 5–10 µ thick. In Examples 1–6, a porous sheet which is an electrical insulator, and which can be impregnated with sorbent, is used. In order to prevent the outbreak of a fire or other accidents by heat, a desirable sheet consisting mainly of inorganic nonflammable fiber such as ceramic fiber and glass fiber, active carbon fiber and heat-resistant synthetic fiber, nonflammable paper, or appropriate paper containing active carbon, are used. Metal silicate gel, zeolite, active silica gel, active alumina gel, Japanese acid clay, porous glass, active carbon, ion-exchange resin, chelate resin, etc. may be used as adsorbent, and desiccative salts such as lithium chloride, lithium bromide and calcium chloride as absorbent. For desiccative purposes minute particles of zeolite with micropore diameters of 3–10 Å are used, and for adsorbing and removing organic solvent vapors and odorous materials, etc., zeolite with micropore diameters of 6–12 Å or minute particles of high silica zeolite are used.

EXAMPLE NO. 7

Figure 17:
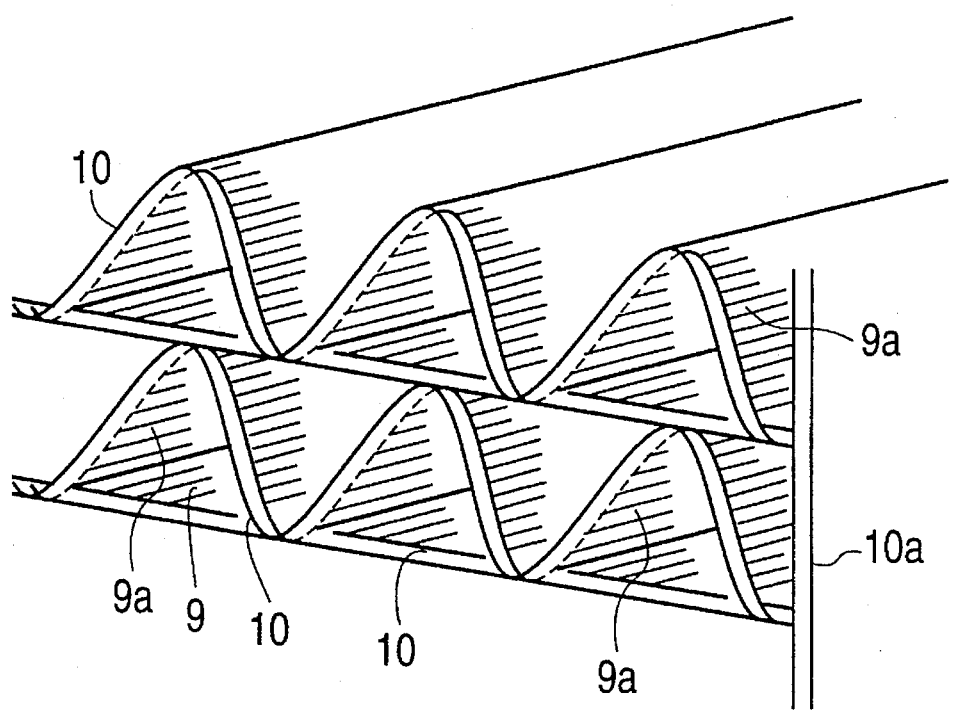
FIG. 17 is a perspective view showing a single-faced corrugated sorbing sheet.
Figure 18:
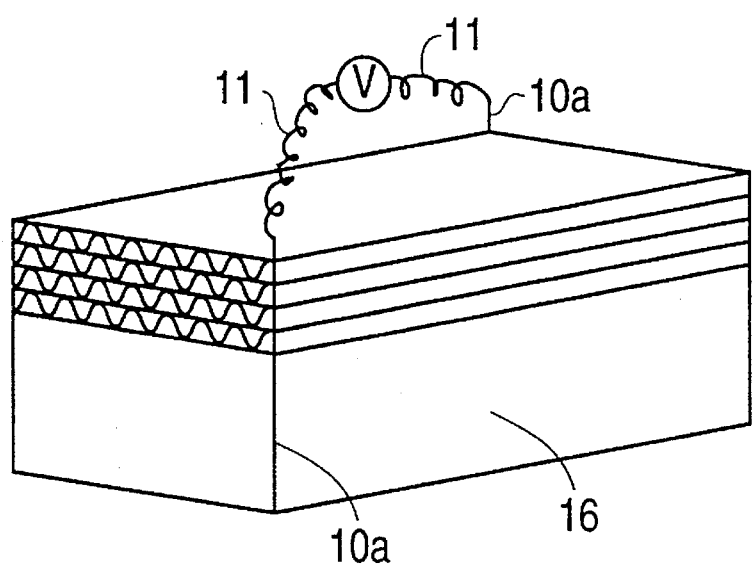
FIG. 18 is a perspective view showing a honeycomb-shaped sorbing laminate.
Figure 24:
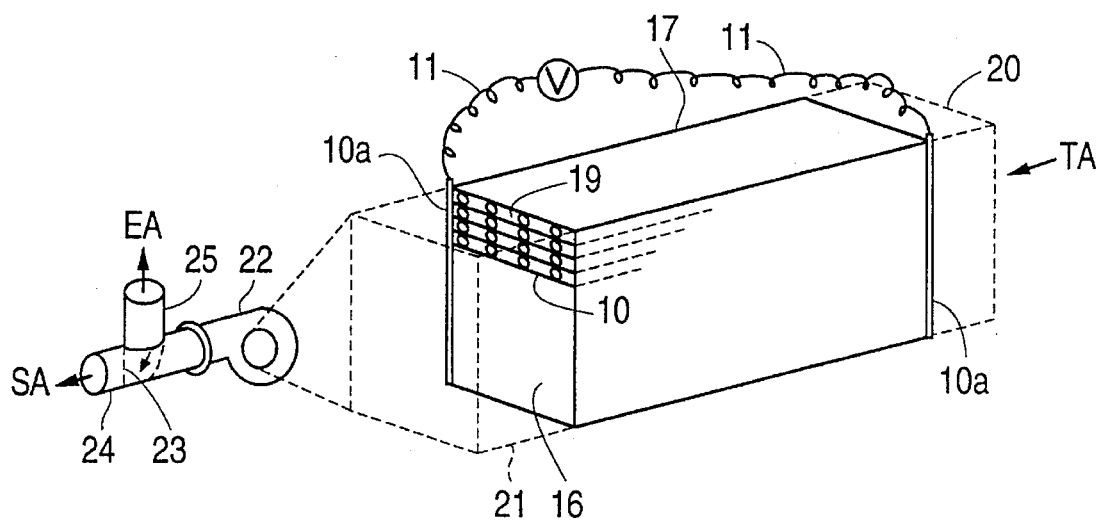
FIG. 24 is a perspective view showing use of the sorbing laminate.

The lead wires 11 are removed from the plane adsorbing sheet 9 shown in FIGS. 1 and 2 with reference to Example 1, and the lead wires 11 are removed from the corrugated adsorbing sheet 9a shown in FIG. 5. Both sheets are adhered as shown in FIG. 17 to obtain a single-faced corrugated sheet. This is the same as in the case of the adsorbing sheet to which resistor wires 2a are placed in zigzag lines in Example 2 and in the cases of Examples 3–6. These single-faced corrugated sheets are piled up with or without being adhered together to form a parallelepiped honeycomb block 16, as shown in FIG. 18. When it is piled up without being adhered, the whole is put in a frame 17 as shown in FIG. 24. Both ends of each electrode 10,10 of each adsorbing sheet are connected to electrodes 10a,10a which are connected to lead wires 11,11 and to the power source to obtain a honeycombed-shaped sorbing laminate.

EXAMPLE NO. 8

Figure 19:
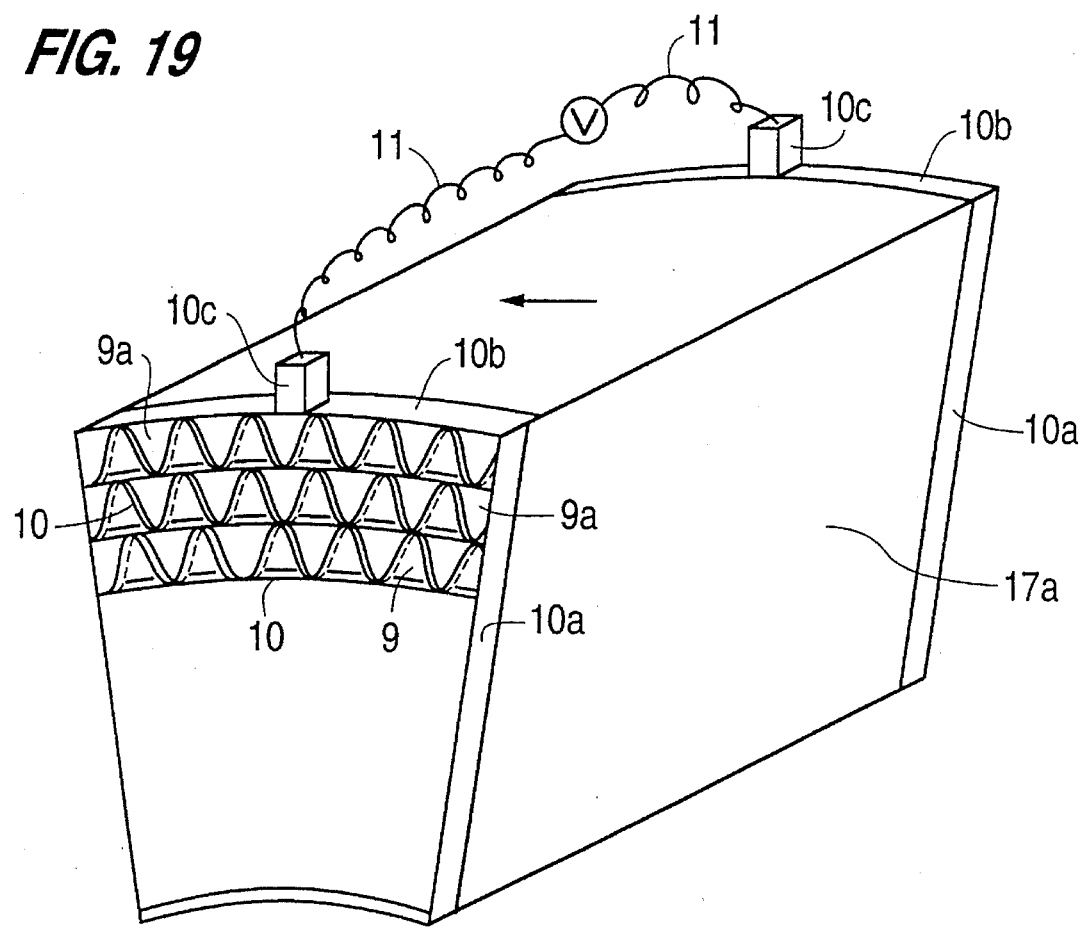
FIG. 19 is a perspective view showing another example of a honeycomb-shaped sorbing laminate.
Figure 20:
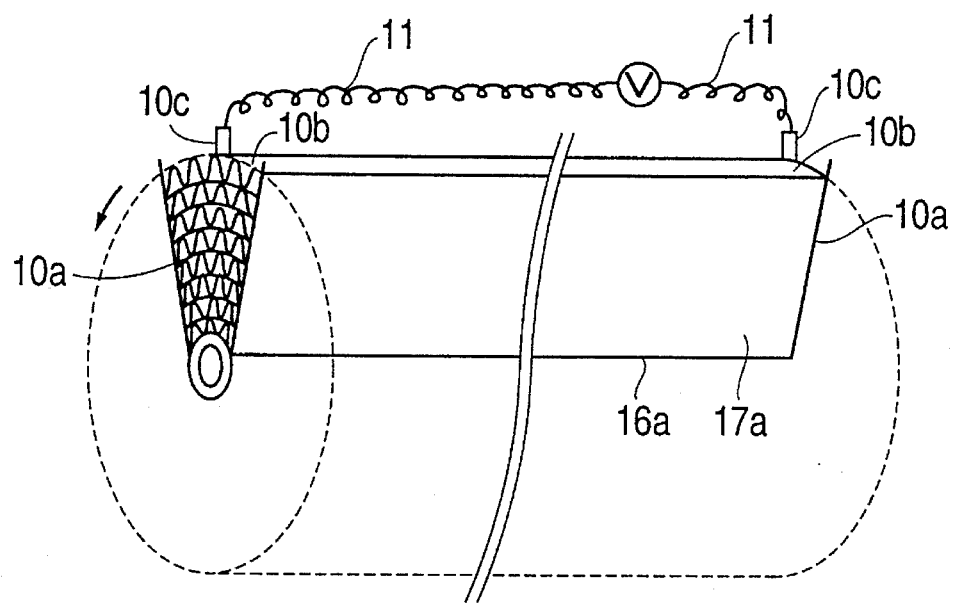
FIG. 20 is a perspective view showing part of a sorbing rotor.

As shown in FIG. 19, the single-faced corrugated sheets mentioned above are piled up, the single-faced corrugated sheets being adhered or being not adhered to each other, and the entire pile is put in a frame 17a. An end of each electrode 10 of each adsorbing sheet is connected to electrodes 10a,10a. Electrodes 10b,10b are fixed along the outer peripheries of the honeycomb laminate and connected with electrodes 10a,10a to obtain a honeycomb-shaped sorbing laminate having a section of a sector. A cylindrical sorbing rotor can be constructed as shown in FIG. 20 by assembling a suitable number of the above-mentioned honeycomb-shaped sorbing laminates having a section of a sector.

Stationary electrodes 10c,10c are connected with sliding on electrodes 10b,10b of a honeycomb-shaped sorbing laminate, and lead wires 11,11 are connected to the electrodes 10c,10c and a power source. A cylindrical sorbing rotor as shown in FIG. 20 is rotated as shown as its arrow in the drawing, and each honeycomb-shaped sorbing laminate can be reactivated successively by applying an electric current.

EXAMPLE NO. 9

Figure 21:
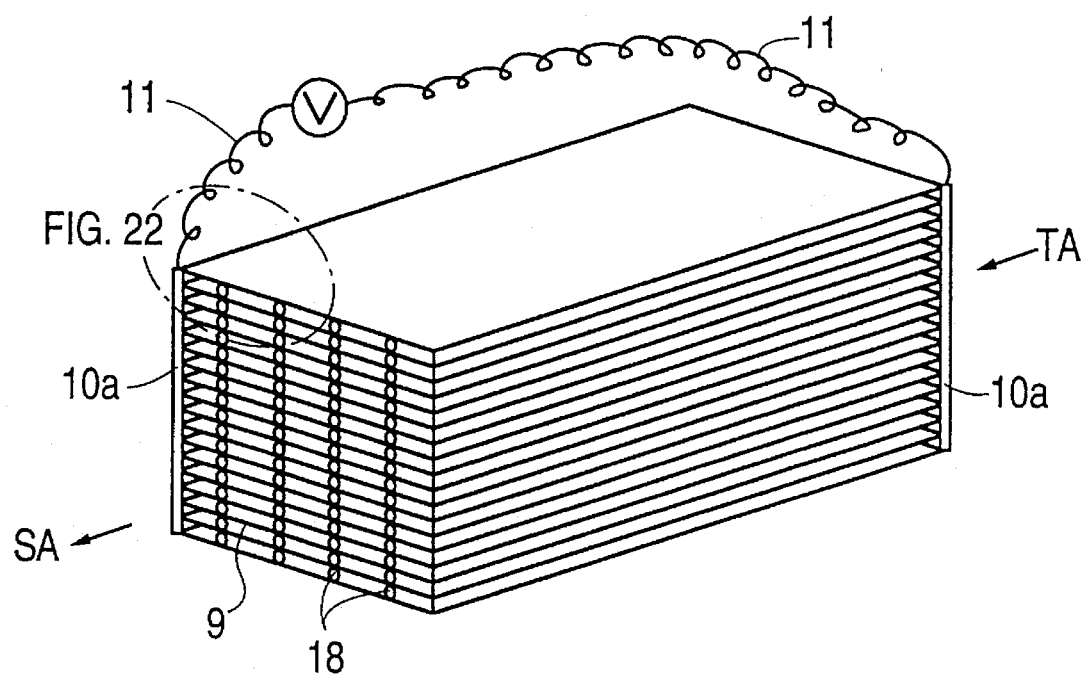
FIG. 21 is a perspective view of another sorbing laminate.
Figure 22:
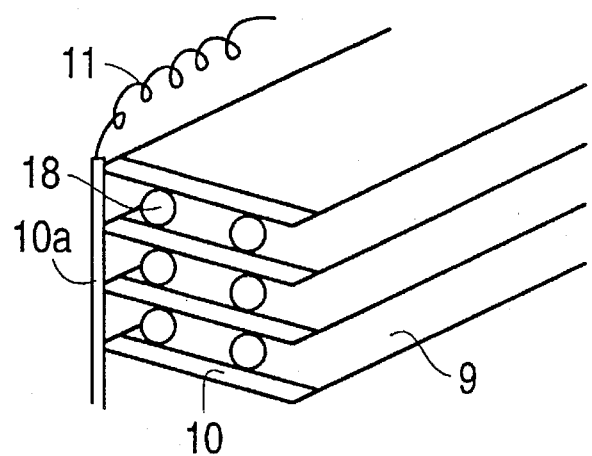
FIG. 22 is an enlarged fragmentary view of the-sorbing laminate of FIG. 21.

Plane adsorbing sheets 9, as mentioned above, are laminated, putting spacers 18 between the adsorbing sheets to obtain a block with gaps between the plane adsorbing sheets, as shown in FIGS. 21 and 22. An end of each electrode 10 of each adsorbing sheet is connected to an electrode 10a, and each electrode 10a is connected to lead wire 11. Each lead wire is connected to a power source to obtain a sorbing laminate.

EXAMPLE NO. 10

Figure 23:
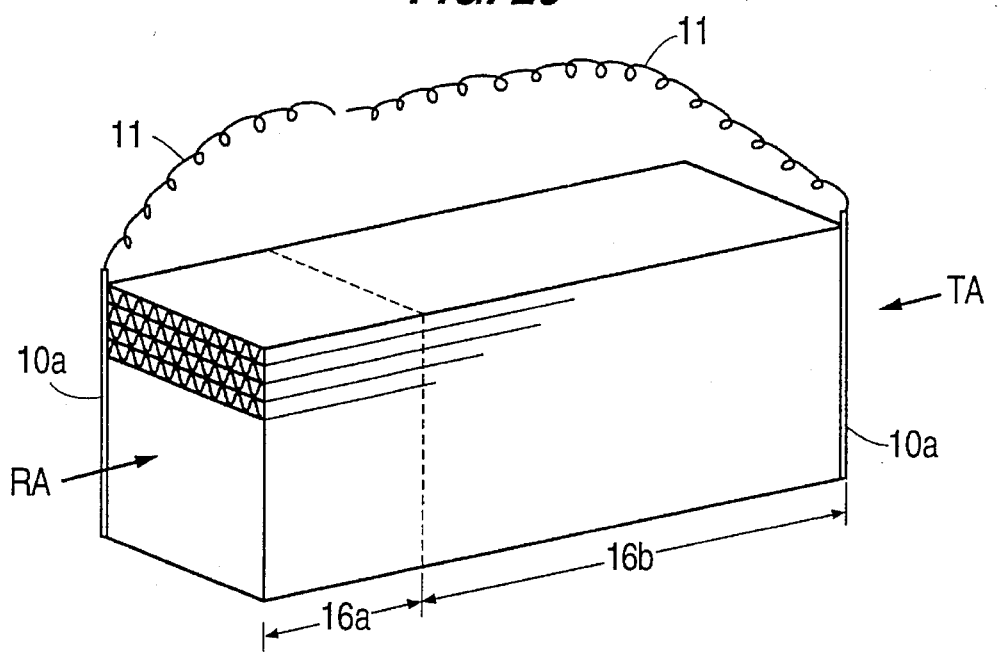
FIG. 23 is a perspective view of another honeycomb-shaped sorbing laminate.

The parallelepiped honeycomb block 16, shown in FIG. 18, is divided into two parts in the direction of penetration of the small channels, as shown in FIG. 23. Sorbent is not fixed to one part 16a and is rigidly fixed to the other part 16b. A resistor is placed over all the surface of 16a,16b as in Examples 1–6 to form a honeycomb-shaped sorbing laminate. It is possible to make the density of the resistor high in the part 16a and low in the part 16b.

The sorbing sheet of the present invention is used for dehumidification/drying and humidity control of air and for sorption/removal of odorous materials and organic solvent vapors in airtight rooms such as semiconductor factories, paint booths, film factories and warehouses, as well as in airtight containers. When sorbent in the sorbing sheet is saturated with humidity or odorous materials, or sorbing capacity of the sorbing sheet decreases by humidity or odorous materials, a current is applied to heat the sorbing sheet and the sorbate is desorbed. After this, sorption and reactivation are repeated to provide dry air or clean air.

When a sheet containing active carbon fiber as a main component or a suitable paper containing active carbon is used as sheets 1,1a, impregnated sorbent and also sheets 1,1a themselves sorb active materials to improve the sorbing efficiency of the sorbing sheet. When sorption and desorption are repeated for a long time, oil-like material of a high boiling point is produced due to polymerization of sorbate and adheres to the sorbing sheet to decrease its sorbing capacity. In this case, the wattage of the resistor is increased to raise the temperature of the sorbing sheet to 200°–400° C. and the current is applied for 1–4 hours to decompose the oil-like material to invigorate the sorbing sheet.

The sorbing laminate of the present invention is used to obtain dry air or clean air by passing a gaseous body such as air containing active ingredients to be removed such as humidity, organic solvent vapor and offensive odorous materials through its small channels for the sorbent to sorb and remove the above-mentioned active ingredients on the wall of the small channels. To explain this more concretely, as shown in FIG. 24, ducts 20,21 are connected to small channels 19 at both ends of the sorbing laminate 16, to which electrodes 10,10a,10a and lead wires 11,11 are connected. A blower 22, a switching valve 23 and ducts 24,25 are connected to the duct 21. The blower 22 is operated to send air TA to be processed from the duct 20 into the laminate. Active ingredients in air TA are sorbed and removed by the sorbing laminate 16, and then dry air or clean air SA is supplied through the duct 24. In desorption and reactivation, electrodes 10a,10a are applied with current to heat the sorbing laminate 16 to desorb the sorbate. At the same time, the switching valve 23 is switched as shown by dotted lines in the drawing and air TA is passed as reactivation air through the honeycomb-shaped sorbing laminate 16 from the duct 20. Exhaust air EA containing desorbed active ingredients passes through the duct 21 and the blower 22, and is exhausted from the duct 25.

Prior sorbing sheets have been reactivated indirectly using a large volume of hot air, i.e., by heat transfer by convection and radiation from the hot air to the solid sorbing wall. Therefore, the heat energy has not always been used efficiently. On the sorbing sheet of the present invention, the resistor contained in the sorbing sheet is directly adhered closely and combined in the sorbing sheet and by applying a current in it the sorbing sheet can be heated rapidly and uniformly all over the area for reactivation of sorbent. Therefore, sorbed humidity and organic solvent vapor are rapidly and efficiently desorbed to reactivate the sorbing sheet. Thus a large quantity of heat energy can be saved compared with prior reactivation systems using hot air, and the sorbing efficiency can be elevated at about 30–40%.

In placing the resistor wires in parallel and in zigzag lines to the sorbing sheet, the density of the resistor wires can be increased to reduce temperature unevenness. It also has the effect of preventing sheet distortion by buffing the difference in heat expansion of the basic sorbing sheet and of the resistor wires. The adsorbing sheet with different zigzag densities of resistor wires can provide ultra-low dewpoint dry air by separately fixing zeolite having high reactivation temperature and high adsorbing force, and active silica gel, etc. having low reactivation temperature and a large adsorption volume, and by introducing process air from the side of small zigzag density of resistor wires to adsorb and remove a large quantity of humidity by silica gel and almost all the remaining humidity by zeolite.

In hot air reactivation of prior sorbing laminates, the temperature difference of the hot air at the inlet and at the outlet was great. Therefore reactivation was not completely performed in the entire area of the laminate with the result that the sorbing capacity was inferior. For desorption and reactivation, the sorbing laminate of the present invention can be heated to desorb the sorbate rapidly and uniformly in the entire area by resistors contained in the entire area of the sorbing sheet constituting the laminate. Therefore, the present invention has an effect that desorption/reactivation can be accomplished in a shorter period of time and with substantially less heat energy.

Figure 25:
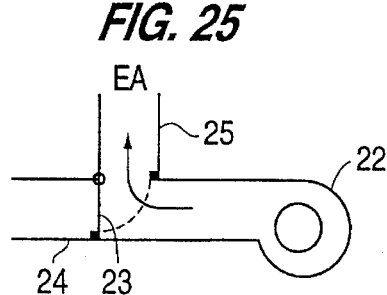
FIG. 25 is a sectional view showing the position of the switching valve 23 in FIG. 24 at the time of reactivation and at the time of cooling.
Figure 26:
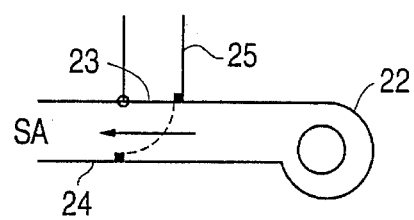
FIG. 26 is a cross-sectional view showing the position of the switching valve 23 in FIG. 24 at the time of dehumidifying.
Figure 27:
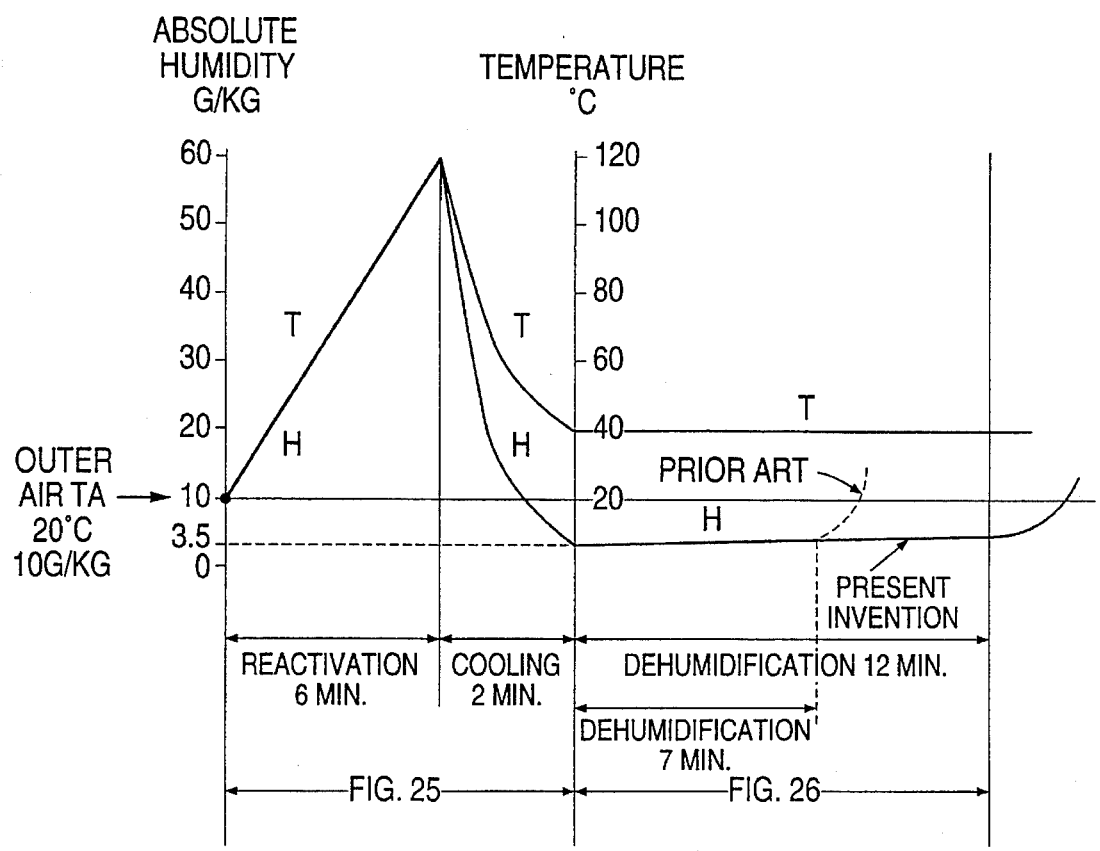
FIG. 27 is a graph plotting changes of temperature and humidity of process air and reactivation air in the sorbing laminate of FIG. 24.

An apparatus such as shown in FIG. 24 was constructed using the adsorbing laminate obtained by Example 9 using the adsorbing sheet shown in FIG. 6 prepared by Example 2. This sorbing laminate was heated and after the switching valve 23 was arranged as shown in FIG. 25, the outer air TA of temperature 20° C. and absolute humidity 10 g/kg was moved in as reactivation air at a speed of 0.5 m/sec. for 6 minutes (reactivation time). Thereafter, electric current for heating was stopped and the above-mentioned outer air TA was sent in as cooling air for 2 minutes (cooling time). The switching valve 23 was then arranged as shown in FIG. 26, and the above-mentioned outer air was moved in as process air at a speed of 1.5 m/sec. for 12 minutes (dehumidifying time) to dehumidify the process air. FIG. 27 shows the temperature T and the absolute humidity H of air at the inlet of the sorbing laminate, and the changes of temperature and absolute humidity of air at the outlet at the processes of reactivation, cooling and dehumidification. In the drawing, the broken lines show the absolute humidity of air at the outlet of the sorbing laminate when hot air is sent in the prior honeycomb-shaped laminate as reactivation air to heat and reactivate the honeycomb-shaped laminate.

It is clear from the foregoing that the prior honeycomb block decreases its dehumidifying capacity after about 7 minutes of dehumidifying, 6 minutes of reactivation and 2 minutes of cooling. In the case of the adsorbing laminate containing reactivating function according to the present invention, the dehumidification time was approximately 12 minutes when the reactivation time and the cooling time were as noted above. This means the adsorbing laminate of the present invention has a dehumidification capacity approximately 1.8 times that of the prior art. In this case, a resistor of 1.2 kW was used for the electric power, and the amount of outer air TA was 60 m³/hr.

In prior methods of heating and desorption by introducing heated air, a thin boundary layer always exists between the air stream and the honeycomb channel wall to prevent heat conduction. In the present invention, resistors are contained in the sheet which constitutes the honeycomb wall, closely adhered and combined to one another. Therefore, heat conduction can be performed rapidly in reactivation process, and the reactivation time is about half that compared with the prior art using hot air, and all the generated heat is used for reactivation. Moreover, as it is possible to heat to desorb sorbate only, no energy is wasted and only the latent heat capacity for desorbing sorbate is necessary and the energy for reactivation is reduced by half. By regulating the heating time, the temperature increase of the honeycomb laminate itself can be controlled. Thus, it has the advantageous result that the cooling time before the sorbing process can be shortened.

Although the preferred embodiments of the present invention have been described, it is to be understood that other embodiments may exist and changes made without departing from the spirit and scope of the invention.

What is claimed is:

1. A method for manufacturing an adsorbing sheet providing reactivating and invigorating functions, comprising the steps of:

(a) chemically synthesizing and fixing an adsorbent on the surface of and within a sheet containing a resistor embedded in the sheet, and (b) connecting terminals to both ends of the resistor to make reactivation and invigoration possible with the application of electric current.

2. A method of manufacturing an adsorbing sheet as in claim 1, including the steps of impregnating water glass in said sheet containing said resistor and drying same, impregnating an aqueous solution of a metal salt in said sheet, and synthesizing metal silicate gel in and on said sheet by the reaction of said water glass and said metal salt, said metal silicate gel being fixed in and on said sheet.

3. A method of manufacturing an adsorbing sheet as in claim 1, including impregnating water glass in said sheet containing said resistor and drying same, impregnating an acid in said sheet, and synthesizing silica gel in and on said sheet by the reaction of said water glass and said acid, said silica gel being fixed in and on said sheet.

4. A method of manufacturing a sorbing sheet as in claim 1, in which resistor wires contained in the sorbing sheet are placed in parallel and/or in zigzag lines.

5. A method of manufacturing a sorbing sheet as in claim 1, in which resistor wires are placed in parallel and buried in an insulating coating agent on the surface of said sorbing sheet so that reactivation and invigoration can be accomplished by applying electric current.

6. A method of manufacturing a sorbing sheet as in claim 1, in which said sorbing sheet contains a plane-type resistor produced by the etching of metallic film.

7. A method of manufacturing a sorbing sheet as in claim 1, in which the wattage density of said sorbing sheet can be changed by varying the density of resistor wires when said wires are placed in parallel and in the zigzag lines.

8. A method of manufacturing a sorbing sheet as in claim 1, wherein said sheet consists mainly of a fiber selected from the group consisting of inorganic fiber, carbon fiber, active carbon fiber and heat-resistant synthetic fiber.

9. A method of manufacturing a sorbing sheet providing reactivating and invigorating functions, comprising the steps of:

(a) rigidly adhering and impregnating a sorbent on the surface of and within a sheet containing a resistor embedded in the sheet, and (b) connecting terminals to both ends of said resistor to make reactivation and invigoration possible with the application of electric current.

10. A method of manufacturing a sorbing sheet as in claim 9, wherein said sorbent is an adsorbent selected from the group consisting of zeolite, silica gel, alumina gel and active carbon.

11. A method of manufacturing a sorbing sheet as in claim 9, wherein said sorbent is an absorbent selected from the group consisting of lithium chloride and calcium chloride.

12. A method of manufacturing a sorbing sheet as claim 9, in which resistor wires contained in the sorbing sheet are placed in parallel and/or in zigzag lines.

13. A method of manufacturing a sorbing sheet as in claim 9, in which resistor wires are placed in parallel and buried in an insulating coating agent on the surface of said sorbing sheet so that reactivation and invigoration can be accomplished by applying electric current.

14. A method of manufacturing a sorbing sheet as in claim 9, in which said sorbing sheet contains a plane-type resistor produced by the etching of metallic film.

15. A method of manufacturing a sorbing sheet as in claim 9, in which the wattage density of said sorbing sheet can be changed by varying the density of resistor wires when said wires are placed in parallel and in the zigzag lines.

16. A method of manufacturing a sorbing sheet as in claim 9, wherein said sheet consists mainly of a fiber selected from the group consisting of inorganic fiber, carbon fiber, active carbon fiber and heat-resistant synthetic fiber.

* * * * *

UNITED STATES PATENT AND TRADEMARK OFFICE
CERTIFICATE OF CORRECTION

PATENT NO. :   5,501,007
DATED      :   March 26, 1996
INVENTOR(S) :  Toshimi KUMA It is certified that error appears in the above-indentified patent and that said Letters Patent is hereby corrected as shown below:

Column 2,     line 52, change "A-A" to --9-9--;
              line 56, change "B-B" to --11-11--;
              line 64, change "C-C" to --14-14--;

Column 3,     line 1, change "D-D" to --16-16--; and
              line 13, delete "-".

Signed and Sealed this

Second Day of July, 1996

BRUCE LEHMAN

Attest:

Attesting Officer        Commissioner of Patents and Trademarks